March 26, 1963     S. R. WALSTROM ET AL     3,083,058
PORTABLE DUMP APPARATUS
Filed May 21, 1958                      5 Sheets—Sheet 4
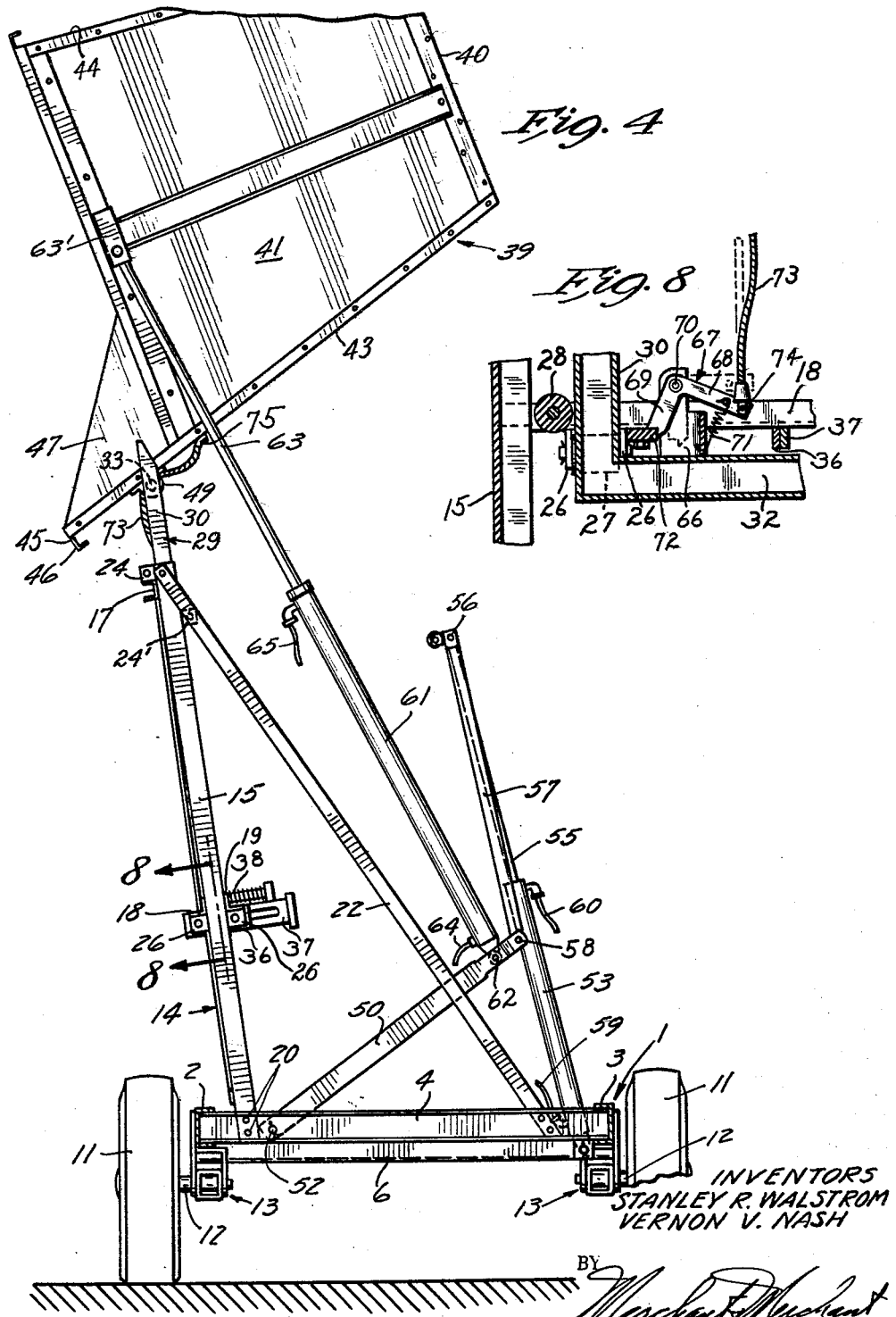

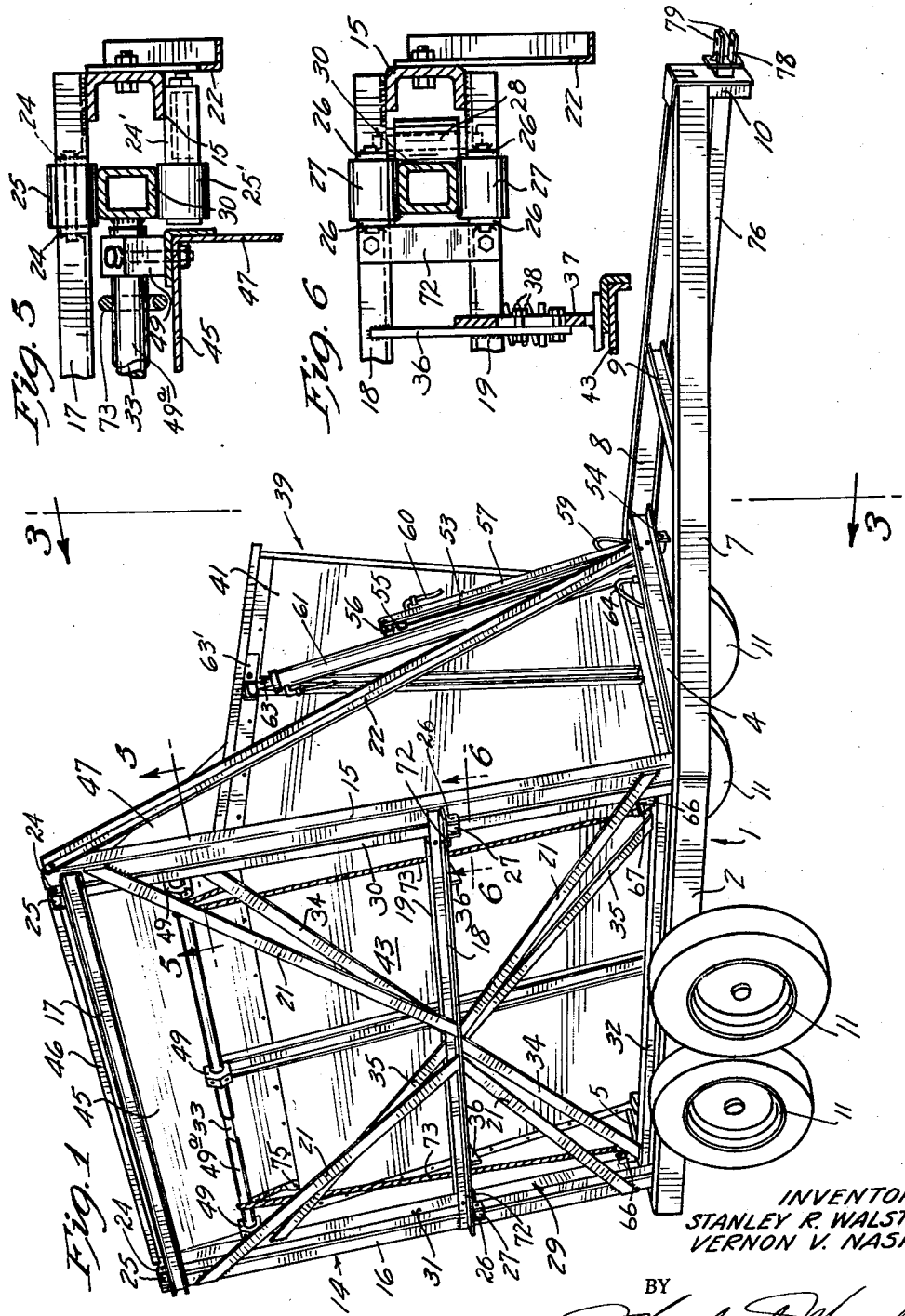

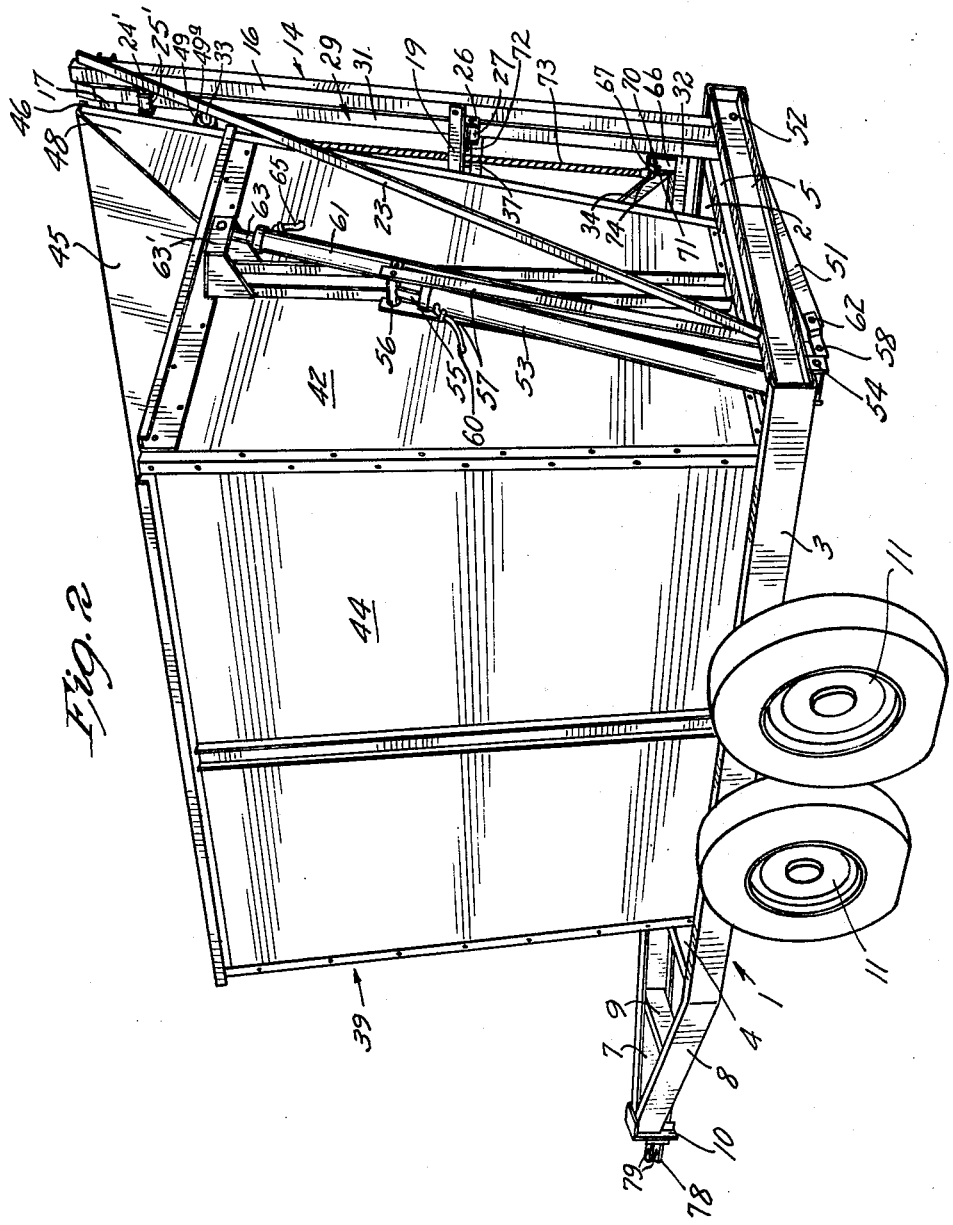

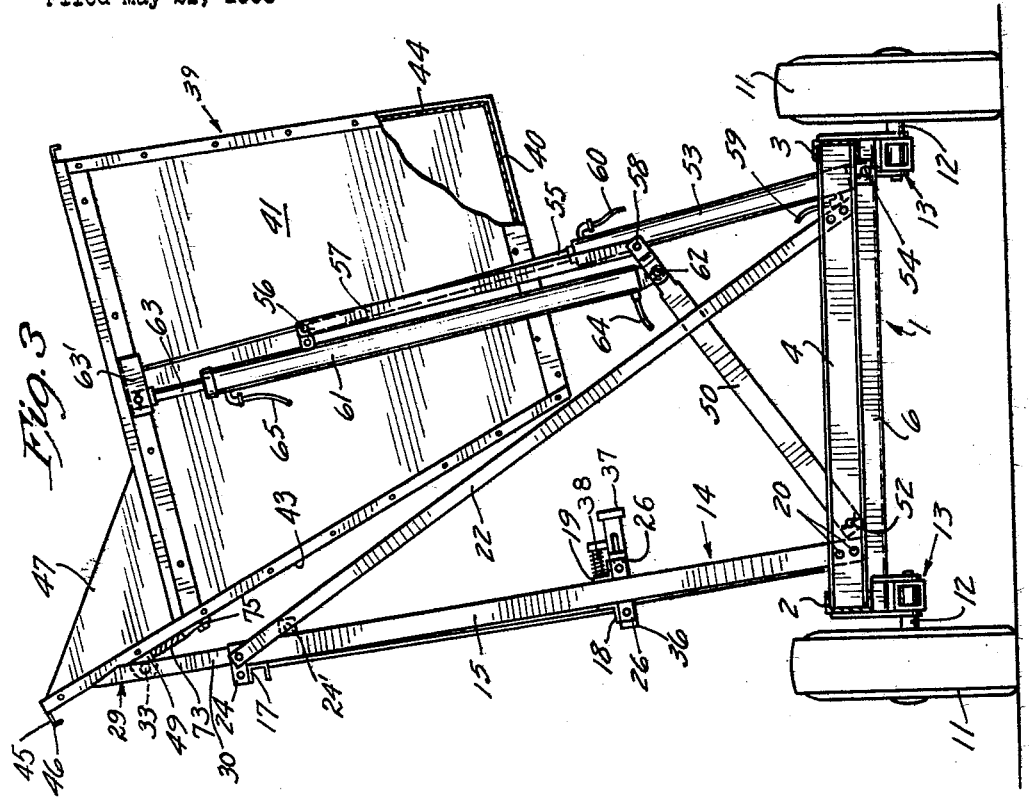

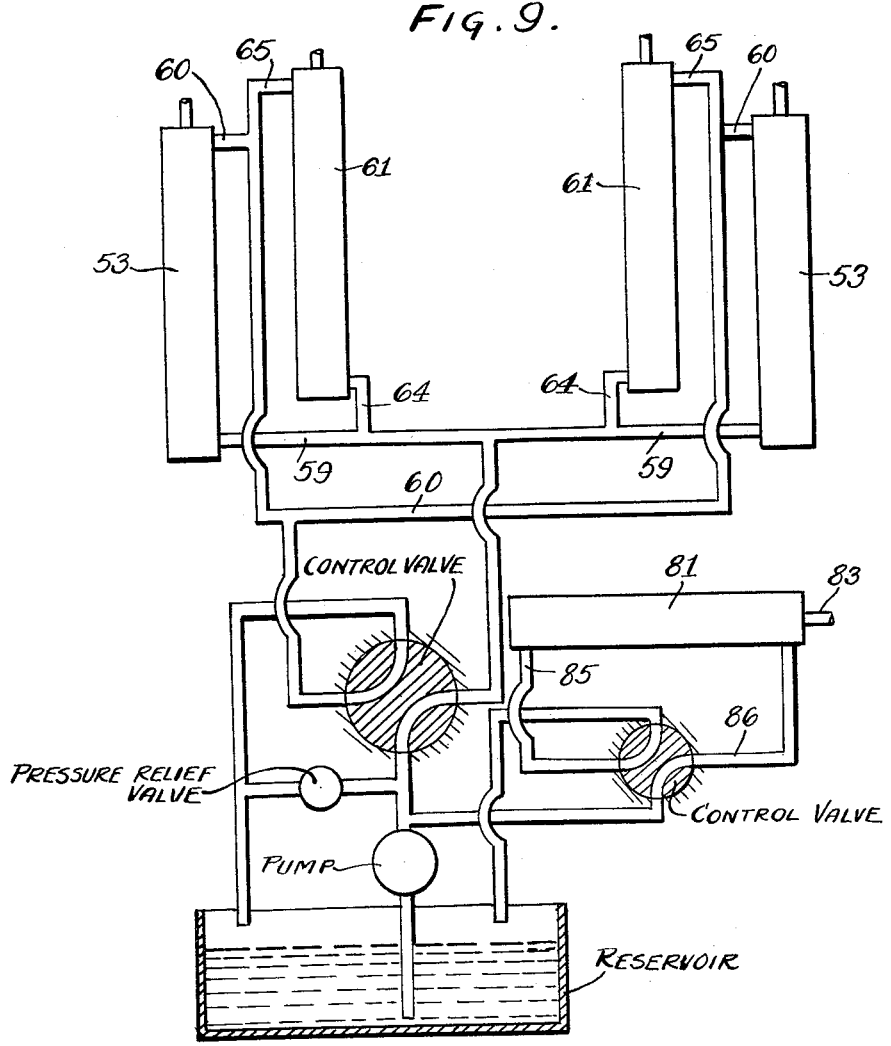

United States Patent Office 3,083,058
Patented Mar. 26, 1963

3,083,058
PORTABLE DUMP APPARATUS
Stanley R. Walstrom, Minneapolis, and Vernon V. Nash, Hopkins, Minn., assignors to Daffin Corporation, a corporation of Delaware
Filed May 21, 1958, Ser. No. 736,878
5 Claims. (Cl. 298—11)

Our invention relates generally to material handling apparatus, and more particularly to dump boxes of the mobile variety, and which are movable between a relatively low material receiving position with respect to the ground and a relatively high dumping position.

An important object of our invention is the provision of a portable dump box including novel mobile mounting means and elevating mechanism whereby an open-topped box element is moved from a material receiving position at a low elevation to a laterally displaced dumping position at a relatively high elevation, wherein the lateral displacement permits the mobile mounting means to be laterally spaced a substantial distance from the point of delivery of material discharged from the box element.

The dump box of our invention is adapted to be coupled to a pulling vehicle such as a conventional harvesting machine having an elevator or other suitable conveyor means whereby harvested material is discharged into the dump box. Normally, the discharge end of the conveyor overlies the dump box when discharging material therein, and must be displaced therefrom when it is desired to empty the box, to permit upward movement of the dump box toward its dumping position. Another object of our invention is, therefore, the provision of novel means for shifting our improved dump box with respect to the pulling vehicle therefor in opposite directions longitudinally of the direction of travel, whereby the dump box is moved between a material receiving position underlying the discharge end of a conveyor means, and a delivery position spaced from said receiving position wherein the dump box will clear the conveyor means when said dump box is raised to its dumping position.

Another object of our invention is the position of relatively simple and efficient mechanism for first raising the dump box element to its upper limit of elevation, and thereafter tilting the same to a dumping position, all in one continuous uninterrupted movement. To this end, we provide a wheel mounted frame structure having generally upright guide means at one side thereof, a carriage mounted in said guide means for upward and downward movement, an open-topped dump box pivotally mounted on the carriage for common movements therewith and for tilting movements with respect thereto, a base member mounted for generally upward and downward movements relative to the frame structure, elevating mechanism for raising and lowering the base member, and independent mechanism coupled to the base member and to the box for moving the carriage and dump box relative to the base member. When said mechanisms are operated, the base member, carriage and dump box element are raised to the upper limit of movement of the carriage, whereupon the dump box tilts about its axis of tilting movement to a dumping position at a level above the upper end of the guide means and carriage.

Another object of our invention is the provision of novel mechanism for locking said carriage in its raised position during tilting movement of the dump box, and for releasing said carriage for downward movement responsive to swinging movement of said dump box toward its material receiving position relative to said carriage.

Still another object of our invention is the provision of apparatus as set forth which is relatively simple and inexpensive to manufacture, which is highly efficient in operation, and which is extremely rugged in construction and durable in use.

The above, and still further highly important objects and advantages of our invention will become apparent from the following detailed specification, appended claims and attached drawings.

Referring to the drawings, which illustrate the invention and in which like characters indicate like parts throughout the several views:

FIG. 1 is a view in perspective of a portable dump apparatus made in accordance with our invention, as seen from the front and one side thereof;

FIG. 2 is a view in perspective of the apparatus of FIG. 1 as seen from the rear and opposite side thereof;

FIG. 3 is a view partly in front elevation and partly in section, taken substantially on the line 3—3 of FIG. 1, and showing the carriage and dump box element of our invention in a raised position.

FIG. 4 is a view corresponding to FIG. 3 but showing the dump box element raised and tilted to a dumping position, some parts being broken away;

FIG. 5, Sheet 1, is an enlarged fragmentary section taken substantially on the line 5—5 of FIGURE 1;

FIG. 6, Sheet 1, is an enlarged fragmentary detail in section taken substantially on the line 6—6 of FIG. 1;

FIG. 7 is a fragmentary view in perspective of the front end portion of the frame structure of our novel apparatus, showing our improved hitch mechanism;

FIG. 8 is an enlarged detail taken substantially on the line 8—8 of FIGURE 4; and FIG. 9 is a diagram illustrating the fluid pressure system for operating our apparatus.

Referring with greater detail to the drawings, the numeral 1 indicates, in its entirety, a horizontally disposed frame structure comprising a pair of laterally spaced parallel side frame members 2 and 3, front and rear pairs of cross frame members 4 and 5 respectively, and a plurality of intermediate transversely extending box element supporting members 6, one of which is shown, see FIGS. 3 and 4. Welded or otherwise rigidly secured to the front ends of the side frame members 2 and 3, are forwardly converging extension members 7 and 8 respectively, that are connected intermediate their ends by a cross member 9 and at their front ends by a guide member 10, see FIGS. 1, 2 and 7. The cross member 9 and guide member 10 are rigidly secured to the extension members 7 and 8 by welding or the like. The frame structure 1 is supported from the ground by pneumatic tire equipped wheels 11 that are journalled on axles 12 carried by conventional mounting means 13 suitably connected to the side frame members 2 and 3. Inasmuch as the mounting means 13 do not, in themseleves, constitute the instant invention, further showing and detailed description thereof is omitted, in the interest of brevity.

A laterally outwardly inclined guide frame, indicated in its entirety by the numeral 14, comprises a pair of spaced parallel inclined guide members 15 and 16, a horizontally disposed top member 17 welded or otherwise rigidly secured at its opposite ends to the upper end portions of the inclined members 15 and 16, and a pair of horizontally disposed intermediate members 18 and 19 welded or otherwise rigidly secured to opposite sides of the inclined members 15 and 16 in downwardly spaced parallel relation to the top member 17, see FIGS. 1, 3, and 4–6. As further shown in FIGS. 3 and 4, the lower ends of the inclined members or legs 15 and 16 are bolted or otherwise rigidly secured to the front and rear cross members 4 and 5 respectively, as indicated at 20. Further rigidity is imparted to the guide frame 14 by angle braces or the like 21, the guide frame 14 being rigidly held in its laterally outwardly inclined position by front and rear strips 22 and 23 that are bolted or otherwise rigidly secured at their upper ends to respective ones of the inclined members or legs 15 and 16, and which at their lower ends are bolted or otherwise rigidly secured to respective cross frame members 4 and 5 adjacent the side frame member 3. At its opposite end portions, the top member 17 is provided with bearing flanges 24 which journal guide rollers 25. It will be noted that these rollers 25 are disposed above the top bar or member 17. Likewise, the intermediate members 18 and 19 are provided with depending bearing flanges 26 in which are journalled guide rollers 27. Adjacent the rollers 27, the intermediate members 18 and 19 form journals for cross guide rollers 28, the purpose of which, and the guide rollers 25 and 27, will hereinafter become apparent. Other members 24', secured to the legs 15 and 16, support guide rollers 25' which engage surfaces of adjacent legs 30 and 31 opposite the guide rollers 25.

Mounted in the guide frame 14 for generally upward and downward movements in or parallel to the plane of the guide frame 14 is a carriage 29 comprising a pair of spaced parallel legs 30 and 31 connected at their lower ends by a rigid tie bar 32, and near their upper ends by a shaft 33. The tie bar and shaft are welded at their opposite ends to the legs 30 and 31, and the carriage is further stiffened by angle braces 34 and 35 welded at their upper ends to the legs 30 and 31 respectively, and at their lower ends to opposite end portions of the tie bar 32. The leg 30 is disposed in closely inwardly spaced relation to the adjacent inclined guide frame member 15, whereas the leg 31 is likewise disposed in closely inwardly spaced parallel relation to its respective guide frame member 16, the legs 30 and 31 being held against lateral movement by the cross guide rollers 28. With reference particularly to FIGURES 5 and 6, it will be seen that the carriage legs 30 and 31 are disposed between the guide rollers 27 at their intermediate portions, the upper ends of the legs 30 and 31 bearing against the guide rollers 25 at the upper ends of the guide frame 14. A pair of bracket elements 36 are welded to opposite end portions of the intermediate guide frame members 18 and 19, said bracket elements 36 slidably supporting a pair of slotted cushioning bars 37 that are yieldingly urged in a direction laterally inwardly from the guide frame 14 by coil compression springs 38, see FIGURES 2-4.

The dump box element of our invention is indicated generally at 39, and is open-topped, the same comprising a generally rectangular bottom wall 40, front and rear end walls 41 and 42 respectively and side walls 43 and 44. The side wall 43 is disposed adjacent the guide frame 14 and carriage 29, and extends upwardly beyond the normal top level of the dump box element 39, as indicated at 45, the extreme upper edge of the portion 45 being formed to provide an out-turned flange or lip 46. The front and rear walls 41 and 42 adjacent the side wall 43 are formed to provide upwardly extended portions 47 and 48 respectively, which cooperate with the extended portion 45 to provide a pouring spout for the dump box element 39. A plurality of clamping elements 49 are rigidly secured to the outer surface of the extension wall 45 and are clamped about a tubular member 49a in axially spaced relationship, said tubular member 49a being journalled on the shaft 33, whereby, when the carriage 29 and dump box element 39 are raised to the limit of upward movement of the carriage 29, the dump box element 39 may be tilted to its dumping position shown in FIGURE 4 and about the axis of the shaft 33. It will be noted that the common axis of the shaft 33 and tubular member 49a extends longitudinally of the direction of movement of the wheel mounted frame structure 1, and that, when the carriage 29 is raised to its upper limit of movement in the guide frame 14, the shaft 33 is disposed directly over the wheels 11 on the adjacent side of the frame structure 1. Thus, when the dump box element 39 is tilted to its dumping position of FIG. 4, the flange or lip 46 is laterally outwardly disposed with respect to the plane of the adjacent wheels 11, so that material dumped from the box element 39 will, if dropped to the ground, land a substantial distance laterally outwardly from the adjacent wheels 11.

A pair of base members in the nature of arms 50 and 51 are pivotally secured at their inner ends, on aligned axes, between respective front and rear pairs of frame members 4 and 5 by means of pivot pins 52 for generally upward and downward swinging movements between lowered positions as shown in FIGURES 2 and 7 and raised positions as shown in FIGURES 3 and 4. Base member elevating mechanism comprises a pair of like fluid pressure cylinders 53 are pivotally connected to the frame structure 1 adjacent the front and rear walls 41 and 42 respectively of the dump box element 39 and at the side of the frame structure 1 adjacent the outside frame member 3, as indicated at 54. The cylinders 53 extend upwardly from their pivotal connections 54 and are provided with cooperating extensible and retractable piston or plunger rods 55 which terminate at their upper ends in crossheads 56. Pairs of lifting links 57 are pivotally connected at their upper ends to each of the crossheads 56 and depend therefrom, the lower ends of said pairs of lifting links being pivotally connected to the free ends of respective arms 50 and 51, as indicated at 58. Fluid under pressure is introduced selectively to opposite ends of the cylinders 53 through conduits 59 and 60 which may be assumed to comprise a portion of a conventional fluid pressure system, not shown. When fluid under pressure is introduced to the bottoms of the cylinders 53 through the conduit 59, the plunger rods 55 move axially outwardly relative to their respective cylinders 53 to impart upward swinging movements to their respective base members or arms 50 and 51; and when fluid under pressure is introduced to the cylinders 53 through the conduits 60, the resultant retracting movements of the piston or plunger rods 55 impart downward swinging movements to their respective arms 50 and 51.

Mechanism cooperating with said base member elevating mechanism comprises a second pair of fluid pressure cylinders 61 pivotally connected at their lower ends one each to a different one of the arms 50 and 51 adjacent their outer ends, as indicated at 62, the cylinders 61 extending generally upwardly from said pivotal connection 62. The cylinders 61 are provided with cooperating reciprocatory piston or plunger rods 63 which extend axially upwardly from their respective cylinders 61, and which are pivotally connected at their upper ends to bracket elements 63' rigidly secured to the upper end portions of the front and rear walls 41 and 42 respectively of the dump box element 39. The opposite ends of the cylinders 61 are provided with fittings for connection to fluid conduits 64 and 65 which, like the conduits 59 and 60, may be assumed to comprise a portion of the aforesaid conventional fluid pressure system not shown. Fluid under pressure, introduced to the lower ends of the cylinders 61 through the conduits 64, will impart extending movements to the plunger rods 63 to move the dump box element 39 upwardly with respect to the base members or arms 50 and 51; whereas fluid under pressure introduced to the upper end portion of the cylinder 61 through the conduit 65, will impart retracting movements to the plunger rods 63 and lowering of the dump box element 39.

When the dump box element 39 is loaded and it is desired to discharge the material therefrom, fluid under pressure is introduced to the lower ends of the pairs of cylinders 53 and 61, preferably simultaneously, through their respective conduits 59 and 64. The resultant upward movement of the plunger rods 55 and 63 causes the carriage 29 and dump box element 39 to move upwardly to the limit of upward movement of the carriage 29, after which continued upward movement of the plunger rods 55 and 63 will impart tilting movement to the dump box element 39 for the dump box 39 to assume its dumping position of FIGURE 4. After material has been discharged from the dump box element 39, fluid flow through the fluid pressure system is reversed to cause introduction of fluid under pressure to the upper ends of the cylinders 53 and 61 through the conduits 60 and 65 to pivotally move the dump box element 39 to its normal generally upright position and lower the same to its material receiving position shown in FIGS. 1 and 2. It will be noted that, when the dump box element 39 approaches its generally upright position, the side wall 43 thereof will engage the adjacent end of the spring biased cushioning bars 37, said cushioning bars absorbing the shock of the downwardly swinging bottom portion of the dump box element 39 against the carriage and the guide frame. It will be appreciated that both the cylinders 53 and 61 cooperate to first raise the dump box element 39 and carriage 29 and then tilt the dump box element 39 after it and the carriage 29 are elevated, responsive to introduction of fluid under pressure to the lower ends of the cylinders 53 and 61 simultaneously. Initial upward movement of either the piston rods 55 or the piston rods 63 will impart upward movement to the carriage 29 and dump box 39, upward movement of both pairs of piston rods 55 and 63 being required to elevate and tilt the dump box element 39. In other words, neither the cylinders 53 or the cylinders 61 alone are of sufficient length to both elevate and tilt the dump box element 39. It will be further appreciated that tilting movement of the dump box element 39 is prevented by the top bar 17 until the dump box element 39 and carriage 29 are raised to an elevation wherein the axis of the shaft 33 is higher than the top bar 17.

For the purpose of automatically locking the carriage 29 at its upper limit of movement in the guide frame 14 during dumping movements of the dump box element 39, we provide automatically releasable latch mechanism now to be described. A pair of opposed bracket elements 66 are welded or otherwise rigidly secured each to an opposite end portion of the tie bar 32, and each having pivotally mounted therein a bell crank 67 opposite arms of which are indicated at 68 and 69, the pivotal connection of each thereof to its respective bracket 66 being indicated at 70. Each of the bell crank levers 67 is provided with a coil tension spring 71 which yieldingly urges its respective bell crank lever 67 toward a latching or locking position indicated by full lines in FIG. 8. Each bell crank lever arm 69 is notched at its free end for latching engagement with a respective one of a pair of strike bars 72 bolted or otherwise rigidly secured to opposite end portions of the intermediate guide frame members 18 and 19. The strike bars 72 are engageable with the tie bar 32 of the carriage 29 to limit upward movement of the carriage 29. A pair of flexible cables 73 are anchored at their lower ends one each to the other end of a different one of the lever arms 68, as indicated at 74, said cables 73 extending upwardly therefrom and over the tubular member 49a, and from thence downwardly to the side wall 43 of the dump box 39, where the upper ends of the cable 73 are anchored to said side wall 43, as indicated at 75. When the dump box element 39 is positioned to rest against the cushioning bars 37 as in FIGS. 1, 2 and 7, the flexible cables 73 are taut, and the bell cranks 67 are in their dotted line position of FIG. 8. Fluid under pressure is introduced to the lower ends of the cylinders 53 and 61 to cause upward movement to be imparted to the carriage 29 until the carriage 29 reaches its limit of upward movement. During this upward movement of the carriage 29 the bell crank levers 67 pass upwardly beyond the strike plates or bars 72 and, as lateral tilting movement is applied to the dump box element 39, the flexible cables 73 become slackened whereupon the springs 71 move the bell crank levers 67 toward their full line position, indicated in FIG. 8, to cause engagement of the notched ends of the arms 69 with their respective strike plates 72 to positively hold the carriage 29 against downward movement during discharge of the contents from the dump box element 39. As fluid under pressure is introduced to the upper ends of the several cylinders 53 and 61, the dump box 39 swings downwardly toward engagement with the cushioning bars 37, such downward swinging movement causing the flexible cables to tighten and move the bell crank levers 67 to their dotted line position indicated in FIG. 8, whereby to release the carriage 29 for downward movement toward its loading position of FIGS. 1 and 2. The above described positive support of the carriage 29 in its upper position prevents the dump box 39 from being swung beyond its discharge position of FIG. 4 through accidental downward movement of the carriage 29, and insures its return to its load receiving position of FIGS. 1 and 2.

An elongated hitch bar 76 extends longitudinally of the frame structure 1 and is mounted for forward and rearward longitudinal sliding movements in the guide member 10 and second guide member 77 secured to the cross member 9 between the forwardly converging extension members 7 and 8. The front end of the hitch bar 76 projects forwardly from the guide member 10 and is bifurcated, as indicated at 78, for reception of a draw bar or the like, not shown, of a tractor or like pulling vehicle, also not shown. The bifurcated portion 78 is provided with a pair of aligned apertures 79 for reception of a conventional hitch pin, not shown. A laterally outwardly opening supporting channel 80 extends longitudinally of the frame 1 between the front cross member 4 and the cross frame member 9 in side by side relation to the hitch bar 76, said channel member 80 being welded or otherwise rigidly secured to said cross members 4 and 9. A fluid pressure cylinder element 81 is mounted within the supporting channel 80 and is bolted at its rear closed end to the rear end portion of the supporting channel 80, as indicated at 82. A piston equipped plunger rod element 83 is mounted in the fluid pressure cylinder element 81 for extending and retracting movements through the front end thereof, the outer end of the plunger rod element 83 being secured to a bracket 84 that is welded or otherwise rigidly anchored to the hitch bar 76 forwardly of the guide member 77. The opposite ends of the cylinder element 81 are adapted to be coupled to a conventional fluid pressure pump and suitable valve mechanism, not shown, by means of conduits 85 and 86 whereby the hitch bar 76 may be moved longitudinally forwardly or rearwardly with respect to the frame structure 1.

As hereinbefore indicated, our novel apparatus is particularly adapted to receive material discharged from a harvesting machine or other apparatus, not shown, such apparatus usually being provided with an elevator or similar discharge mechanism the discharge portion of which will normally overlie the open upper end of the dump box element 39 to discharge material thereinto. When the dump box element 39 has been filled, and it is desired to empty the contents thereof into a conveying vehicle, such as a truck or wagon, fluid under pressure is caused to be introduced to one end or the other of the cylinder element 81 to impart movement to the frame 1 and the parts carried thereby in the desired direction to clear the material discharge apparatus, not shown. When the dump box element 39 is thus moved out from under said discharge apparatus, the same may be raised and tipped to its dumping position of FIG. 4. Further, the above described hitch bar arrangement permits the operator of the pulling vehicle, not shown, to drive the vehicle to a point wherein the dump box element 39 is estimated to be correctly positioned with respect to a hopper, bin, or other receptacle for the material to be dumped. The operator then sets the vehicle brake, and checks alignment of the dump box element with the receptacle for the material. In the event that forward or rearward adjustment is required, it is merely necessary for the operator to cause fluid under pressure to be introduced to the front or rear end of the cylinder element 81 to impart forward or rearward movement to the frame structure 1 and parts carried thereby with respect to the hitch bar 76 until the dump box element 39 is correctly aligned with the receptacle. The dump box element 39 may then be raised and tilted to its dumping position.

Our invention has been fully tested and found to be completely satisfactory for the accomplishment of the objectives set forth; and while we have shown and described a preferred embodiment of our portable dump apparatus, it will be understood that the same is capable of modification within the scope and spirit of the invention as defined in the claims.

What we claim is:

1. In a device of the kind described, a wheel mounted frame structure including a laterally outwardly and upwardly inclined guide frame at one side thereof, means on said frame structure for coupling said frame structure to a towing vehicle, a carriage mounted in said guide frame for generally upward and downward movements parallel to the plane of said guide frame, an open-topped dump box pivotally mounted at its upper end portion on said carriage for common movements therewith and for tilting movements with respect thereto about a horizontal axis extending longitudinally of the direction of movement of said frame structure, a base member pivotally mounted at one end to said frame structure adjacent said guide frame for generally upward and downward swinging movements, elevating mechanism coupled to said frame structure and to the free end portion of said base member for imparting said swinging movements to the base member relative to said frame structure, and independent mechanism coupled to the free end portion of said base member and to the upper end portion of said dump box in laterally spaced relation to the pivotal connection of said dump box to said carriage for moving said carriage and dump box relative to said base member, whereby operation of both said mechanisms in one direction will impart raising movement to said base member and to said carriage to its upper limit of movement and tilting movement to said box to a dumping position after said movement of the carriage to the upper limit of movement thereof.

2. In a device of the kind described, a wheel mounted frame structure including a laterally outwardly and upwardly inclined guide frame at one side thereof, means on said frame structure for coupling said frame structure to a towing vehicle, a carriage mounted in said guide frame for generally upward and downward movements parallel to the plane of said guide frame, an open-topped dump box pivotally mounted at its upper end portion on said carriage for common movements therewith and for tilting movements with respect thereto about a horizontal axis extending longitudinally of the direction of movement of said frame structure, a base member pivotally mounted at one end to said frame structure adjacent said guide frame for generally upward and downward swinging movements relative to said frame structure, a fluid pressure cylinder and a cooperating reciprocatory plunger one of which is pivotally connected to said frame structure, means operatively connecting the other thereof to the free end portion of said base member to raise and lower the same, and a second fluid pressure cylinder and cooperating reciprocatory piston plunger one of which is pivotally connected to the free end portion of said base member and the other of which is pivotally connected to the upper end portion of said dump box in laterally spaced relation to the pivotal connection between said dump box and said carriage, whereby longitudinally outward movements of said piston plungers relative to their respective cylinders will impart upward swinging movement to said base member, raising movement to said carriage to its upper limit of movement, and tilting movement to said box to a dumping position after said movement of the carriage to the upper limit of movement thereof.

3. In a device of the kind described, a wheel mounted frame structure including laterally outwardly and upwardly inclined guide means at one side thereof, a generally rectangular carriage parallel to said guide means and mounted therein for inclined upward and downward movement with respect to said frame structure, an open-topped dump box pivotally mounted at its upper end portion on said carriage for common movements therewith relative to said frame structure and for tilting movements with respect to said carriage about a horizontal axis extending longitudinally of the direction of movement of said frame structure, a base member pivotally mounted at one end to said frame structure for generally upward and downward swinging movements relative to said frame structure, elevating mechanism for raising and lowering said base member relative to said frame structure, independent mechanism coupled to the other end of said base member and the upper end portions of said box for moving said carriage and dump box relative to said base member, operation of said mechanisms in one direction imparting raising movement to said base member and to said carriage to its upper limit of movement and tilting movement to said box to a dumping position after said movement of the carriage to the upper limit of movement thereof, and mechanism for coupling said frame structure to a towing vehicle, said last-mentioned mechanism comprising a fluid pressure cylinder element and a cooperating reciprocatory piston plunger rod element extending longitudinally of the direction of movement of the frame structure, and a hitch bar mounted in said frame structure for longitudinal sliding movement in opposite directions longitudinally of the direction of travel of the frame structure, one of said last-mentioned elements being anchored to said frame structure, the other of said last mentioned elements being coupled to said hitch bar and operative to impart said longitudinal sliding movements thereto.

4. In a device of the kind described, a wheel mounted frame structure including generally upright guide means, a carriage mounted in said guide means for upward and downward movements with respect to said frame structure, an open topped dump box pivotally mounted on said carriage for common movements therewith and for tilting movements with respect thereto about a horizontal axis, a base member mounted for generally upward and downward movements relative to said frame structure, elevating mechanism coupled to said base member and frame structure for raising and lowering said base member relative to said frame structure, independent mechanism coupled to said base member and said dump box for moving said carriage and dump box relative to said base member, whereby operation of said mechanisms in one direction will impart raising movement to said base member and to said carriage to its upper limit of movement and tilting movement to said dump box to a dumping position, mechanism on said guide means and carriage for releasably locking said carriage adjacent its upper limit of travel in said guide means, and a release member for said carriage locking mechanism operatively coupled to said dump box and responsive to movement thereof from its tilted dumping position toward its generally upright material receiving position to automatically release said carriage locking mechanism to permit lowering of said carriage.

5. The structure defined in claim 4 in which said carriage locking mechanism comprises a latch element and a strike element one on said carriage and the other on said guide means, and yielding means urging said latch element toward engagement with said strike element, said release member being connected to said latch element to move the same out of operative engagement with said strike element against bias of said yielding means.

(References on following page)

References Cited in the file of this patent

UNITED STATES PATENTS

| | | |
|---|---|---|
| 1,155,739 | Kunkel | Oct. 5, 1915 |
| 1,171,656 | Robben | Feb. 15, 1916 |
| 1,372,912 | Sibrava | Mar. 29, 1921 |
| 1,725,624 | Dixon | Aug. 20, 1929 |
| 1,778,866 | Ochsnen | Oct. 21, 1930 |
| 1,915,609 | Hollnagel | June 27, 1933 |
| 1,985,169 | Howell et al. | Dec. 18, 1934 |
| 2,494,377 | Cresci | Jan. 10, 1950 |
| 2,672,247 | Jewett | Mar. 16, 1954 |
| 2,718,431 | Pietroroia | Sept. 20, 1955 |
| 2,855,243 | Jones et al. | Oct. 7, 1958 |